United States Patent
Giesler et al.

(10) Patent No.: US 10,960,505 B2
(45) Date of Patent: Mar. 30, 2021

(54) COUPLING DEVICE

(71) Applicant: SAUTER FEINMECHANIK GMBH, Metzingen (DE)

(72) Inventors: Steffen Giesler, Albstadt (DE); Andrea Strobel, Reutlingen (DE)

(73) Assignee: SAUTER FEINMECHANIK GMBH, Metzingen (DE)

( * ) Notice: Subject to any disclaimer, the term of this patent is extended or adjusted under 35 U.S.C. 154(b) by 122 days.

(21) Appl. No.: 16/327,925

(22) PCT Filed: Aug. 30, 2017

(86) PCT No.: PCT/EP2017/001039
§ 371 (c)(1),
(2) Date: Feb. 25, 2019

(87) PCT Pub. No.: WO2018/041405
PCT Pub. Date: Mar. 8, 2018

(65) Prior Publication Data
US 2019/0224795 A1    Jul. 25, 2019

(30) Foreign Application Priority Data
Sep. 3, 2016    (DE) ..................... 10 2016 010 700.6

(51) Int. Cl.
| | | |
|---|---|---|
| *B23B 29/32* | (2006.01) | |
| *B23Q 5/20* | (2006.01) | |
| *B23Q 3/12* | (2006.01) | |

(52) U.S. Cl.
CPC .................. *B23Q 3/12* (2013.01); *B23Q 5/20* (2013.01); *B23B 29/32* (2013.01);
(Continued)

(58) Field of Classification Search
CPC . B23Q 5/20; B23Q 2220/002; Y10T 29/5165; Y10T 29/5155;
(Continued)

(56) References Cited

U.S. PATENT DOCUMENTS 3,977,806 A * 8/1976 Kinoshita ................ B23Q 5/20
408/141
4,872,244 A * 10/1989 Schleich ............... B23B 29/323
29/40
(Continued)

FOREIGN PATENT DOCUMENTS

CN    101537503 A  *  9/2009
DE    4228946 A1  *  2/1996
(Continued)

OTHER PUBLICATIONS

Machine Translation of CN 101537503 A, which CN '503 was published Sep. 2009.*

(Continued)

*Primary Examiner* — Erica E Cadugan
(74) *Attorney, Agent, or Firm* — Wenderoth, Lind & Ponack, L.L.P.

(57) ABSTRACT

A coupling device is for the reversible establishment of a drive connection between a driving unit (13) of a tool turret and a driven unit (46) of a tool receptacle (36) attached to the tool turret and in which a machining tool is able to be received. In a coupling position, a drive shaft (14) of the driving unit (13) is engaged by way of its external toothing (32) with an internal toothing of a driven shaft (44) of the driven unit (46). For a collision-free orientation of the external toothing (32) with respect to the internal toothing, before coupling, an aligning device is used. The orienting device passes through parts of the driven shaft (44) and has a control on one side for the cooperation with the drive shaft (Continued)

(13) and an aligner that is actuable by the control on the other side. The aligner is securable to the tool receptacle.

11 Claims, 8 Drawing Sheets

(52) U.S. Cl.
CPC ..... *B23Q 2220/002* (2013.01); *Y10T 29/5155* (2015.01); *Y10T 29/5167* (2015.01)

(58) Field of Classification Search
CPC ..... Y10T 29/5152–5167; Y10T 29/519; Y10T 408/37; Y10T 82/2587; Y10T 29/5167; B23B 39/20; B23B 39/205; B23B 29/24–29/34
USPC ................. 29/48.5 R, 40, 35.5–48.5 A, 33 J; 408/35; 82/159
See application file for complete search history.

(56) References Cited

U.S. PATENT DOCUMENTS

| | | |
|---|---|---|
| 5,332,344 A | 7/1994 | Thumm et al. |
| 5,745,967 A * | 5/1998 | Kojima ................. B23Q 5/048 29/40 |
| 6,234,731 B1 * | 5/2001 | Sakamoto ............. B23B 31/261 409/144 |
| 6,925,694 B2 * | 8/2005 | Sauter .................... B23Q 39/02 29/39 |
| 7,971,328 B2 * | 7/2011 | Sahm ....................... B23Q 5/04 29/40 |
| 2012/0168190 A1 | 7/2012 | Linder et al. |
| 2013/0074301 A1 * | 3/2013 | Stiefel ................... B23Q 11/04 29/39 |

FOREIGN PATENT DOCUMENTS

| | | | |
|---|---|---|---|
| DE | 10130446 A1 | * | 1/2003 |
| DE | 102005033890 A1 | * | 1/2007 |
| DE | 102009042772 A1 | * | 7/2011 |
| DE | 102012007176 A1 | * | 10/2013 |
| DE | 102014003336 A1 | * | 9/2015 |
| EP | 585600 A1 | * | 3/1994 |
| EP | 732171 A1 | * | 9/1996 |
| EP | 841121 A1 | * | 5/1998 |
| JP | 05-285709 A | * | 11/1993 |
| WO | WO-2011/035866 A1 | * | 3/2011 |

OTHER PUBLICATIONS

International Search Report (ISR) dated Dec. 8, 2017 in International (PCT) Application No. PCT/EP2017/001039.

* cited by examiner

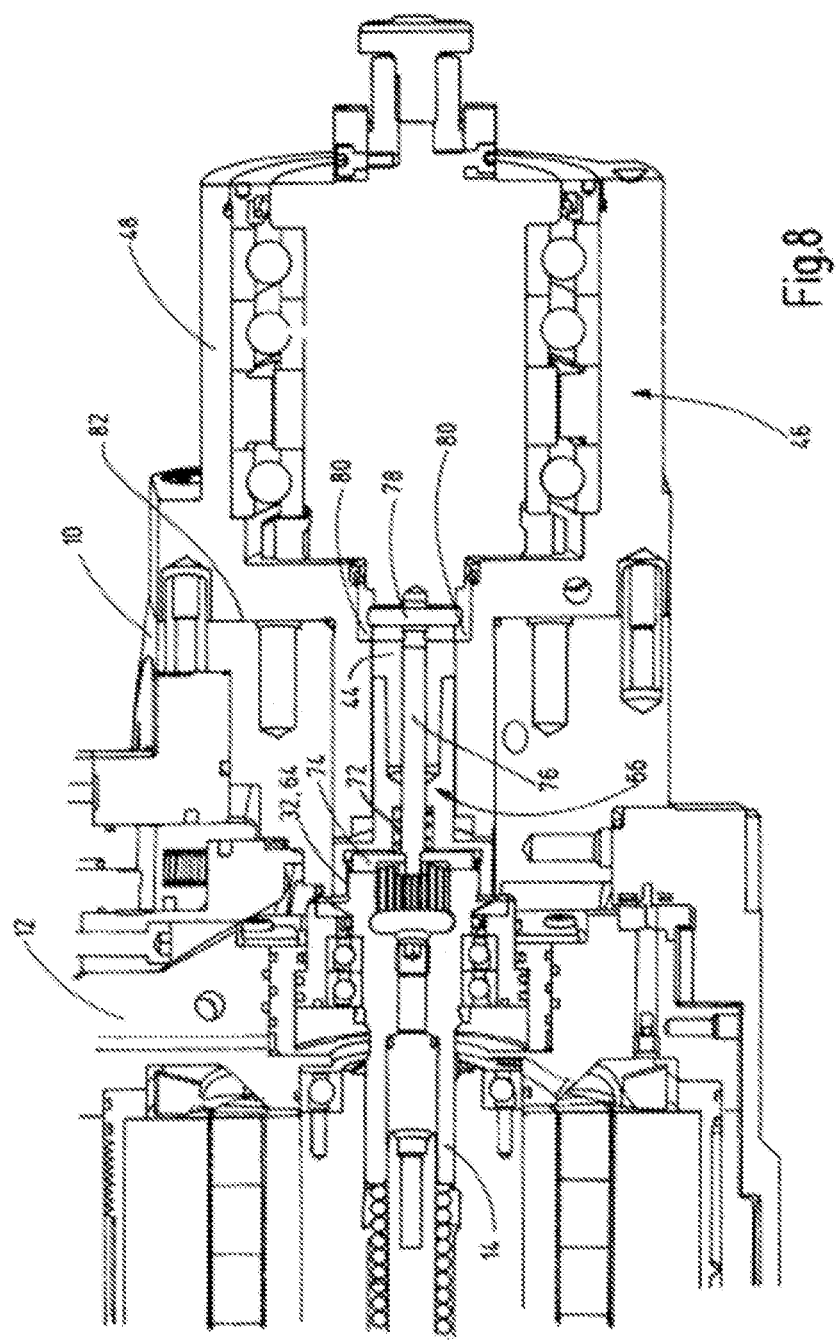

COUPLING DEVICE

FIELD OF THE INVENTION

The invention concerns the detachable engagement of a drive connection between a drive unit of a tool turret and an output unit of a tool holder that is attached to the tool turret. A machining tool may be retained in the tool holder. The invention concerns a tool turret as well as a tool holder comprising at least parts of such a coupling device.

BACKGROUND OF THE INVENTION

DE 10 2009 042 772 A1 discloses a drive device for selectively driving a tool holder disk of a tool turret and at least one machining tool, which is attached to the tool holder disk by a tool holder, which may be driven by two drives that have a common drive device comprising a drive shaft. The drives are connectable with one another via a coupling device that may be controlled by at least one operating device each. The drives have the purpose of driving the tool holder disk or the machining tool. At least the drive device together with the drives are disposed inside the tool holder disk.

In one operating mode of the known coupling device, the drive shaft of the drive unit of the tool turret engages, in one clutch position, its internal gearing with an external gearing of the output shaft of the output unit of the tool holder for rotationally driving a machining tool that was attached for this purpose. Once the machining process has been completed with this particular tool, the clutch is released by disengaging the gearing. Through rotating or swivelling of the tool holder disk with respect to the stationary drive unit of the tool turret, a new tool holder with its tool, which is disposed on the outer circumference of the tool holder disk, can be moved into machining position, for which the coupling device then engages again the gearing of drive shaft and output shaft.

To achieve a collision-free coupling process, it is necessary to align the gearing exactly so that the teeth of the one gearing, such as the external gearing of the output shaft, are able to engage, largely without play, in the spaces between the teeth of the other gearing, in this instance in form of the internal gearing of the drive shaft. To ensure this anti-rotation, locks are used, which are also known in the industry as indexing devices.

An anti-rotation lock of this kind is disclosed in DE 42 28 946 A1 for a spindle head for tool turrets, in which a spindle is rotatably supported. The spindle is disposed on a bushing that is longitudinally moveable but non-rotatable, comprising a locking element. As an anti-rotation lock in its effective operating position, the axial displacement range of the bushing is limited in the one direction through positive locking, and is engaged with a locking element of the housing. Through axial displacement of the bushing against the force of a pre-tensioned spring, the bushing can be disengaged from the locking element of the housing. The surfaces of the locking elements that cooperate in their effective operating position, at least those of the one locking element, are inclined with respect to the axial direction to a degree that excludes self-locking. In this manner, it is possible to limit the torque that can be transferred via the locking elements to a value that prevents damage or destruction. Furthermore, in this manner it is ensured without particular precision that the clutch profile provided on the spindle can be aligned exactly with the profile of the clutch counterpart so that a collision between the profiles, which are usually in form of gear profiles, cannot occur. An anti-rotation lock of this kind or similar is usually attached to the outer circumference of the output shaft of the output unit of every known tool holder.

Although the known coupling devices with anti-rotation lock have proven themselves successfully in practical application, problems can occur if it is desired to transfer a higher machining torque with the drive unit of the tool turret. This limitation is because the highest transferable torque is always limited by the strength of the shaft-hub connection in form of the engaged gears, which is by design necessarily relatively low.

SUMMARY OF THE INVENTION

Based on this prior art, an object of the invention is to provide improved coupling devices in that a shaft-hub connection permits the transfer of higher torque moments, in particular when using more powerful direct drives as drive units with tool turrets.

This object is basically met by a coupling device where, a drive shaft of the drive unit is in one clutch position engaged through its external gearing with the internal gearing of an output shaft of the output unit, by design. It is then possible through larger diameters of the shaft-hub pairing of external and internal gearing to transfer a greater amount of torque, and therefore, greater machining torque to the machining tool retained in the tool holder. Such transfer is not possible with the described current gearing solutions, which use gearing on smaller diameters for machining.

To be able to easily engage the external gearing of the drive shaft with the internal gearing of the output shaft on a larger diameter, according to the invention, an aligning device ensures a collision-free alignment of the external gearing to the internal gearing prior to the coupling process. The aligning device is no longer disposed on the outer circumference of the output shaft, as described in the prior art, but rather extends through parts of the output shaft and is provided on the one side with a control to interact with the drive shaft. On the other side an aligner is controlled by the control. The aligner may be attached to the tool holder. This arrangement has no equivalent in the prior art, even when including tool turret and tool holder solutions, which are provided with at least some components of the coupling device according to the invention.

Advantageously, it is still possible with the changed, new coupling device to attach tool holders of the conventional kind to the new coupling device since they are still provided with an internally located internal gearing on the drive shaft of the drive unit, besides the externally located external gearing. The internal gearing may be coupled with a conventional external gearing of an output shaft of an output unit of the tool holder. A largely modular tool holder disk concept for a tool turret of a machine tool is then realised with which new and old tool holders may be retained as required by the application.

Other objects, advantages and salient features of the present invention will become apparent from the following detailed description, which, taken in conjunction with the drawings, discloses a preferred embodiment of the present invention.

BRIEF DESCRIPTION OF THE DRAWINGS

Referring to the drawings that form a part of this disclosure and that are schematic and not to scale:

FIGS. 7 and 8 are partial perspective views in section using a tool holder according to the depictions in FIGS. 3 and 4 with parts of the coupling device according to the invention, wherein the FIG. 7 shows the tool holder in an operating state equivalent to FIG. 3 and the FIG. 8 corresponds to the operating state of the tool holder according to FIG. 4.

DETAILED DESCRIPTION OF THE INVENTION

Figure 1:
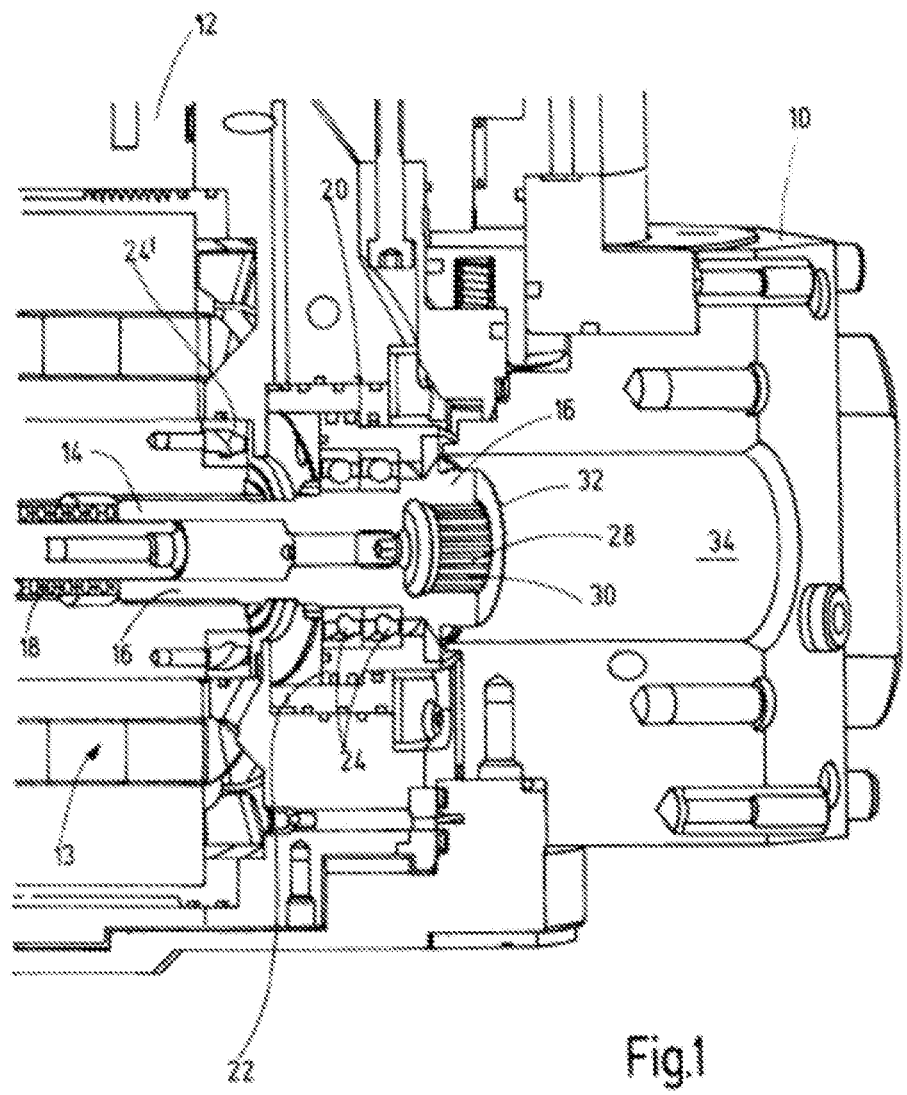
FIG. 1 is a partial perspective view in section of a part of a tool turret of a machine tool (not depicted in detail) with a part of the coupling device according to an exemplary embodiment of the invention.
Figure 5:
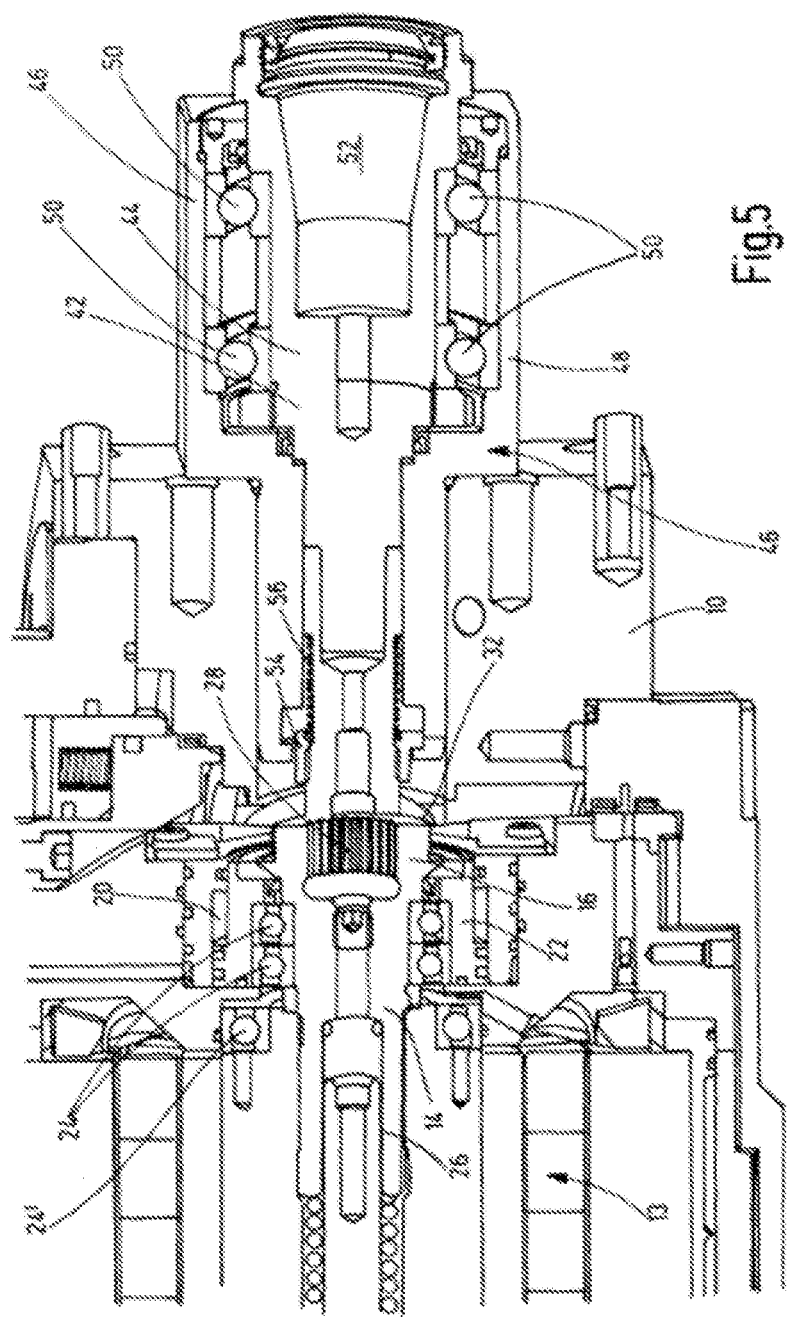
FIGS. 5 and 6 are partial perspective views in section, for a clutch engagement, the insertion of spindle head-shaped tool holder according to FIG. 2 into a tool turret according to FIG. 1, and the completed clutch engagement between tool holder and tool turret, respectively.

The FIG. 1 depicts parts of a tool turret for a machine tool (not shown), wherein the tool turret is part of the machine, for example, in form of a milling machine for the machining of a work piece. To this end, a tool holder disk 10 is pivotally or rotationally guided around stationary housing components 12 of the tool turret which, in modern direct-concept drives, accept a drive unit 13 with a drive shaft 14 for the tool turret. The drive unit 13, which is usually in form of an electromotor, is preferably an integral component of the stationary housing components 12 of the tool turret, and solutions of this kind are disclosed in, for example, DE 101 30 446 A1, DE 10 2009 042 772 A1 or in DE 10 2005 033 890 A1. The drive shaft 14 is in the usual manner rotatably supported by commonly used bearings 24, 24' (not described in detail) inside the housing components 12, is provided in multiple sections and comprises a frontal engagement part 16. Frontal engagement part 16 may be moved by an energy store, for example a compression spring 18, into its front-most position, as shown in FIG. 1, as soon as an opposite-directed, hydraulic force is no longer present. A hydraulic annular chamber 20, as shown for example in FIG. 5, serves to provide the hydraulic force. The hydraulic annular chamber 20, to which hydraulic pressure is applied, ensures that a hydraulic stepped piston 22 is returned against the force of the compression spring 18 from right to left when viewing the drawings, and then assumes its end position, as shown in FIG. 5. While retaining the two front bearings 24, the cylindrical stepped piston 22 carries back with it the front engagement part 16 of the drive shaft 14, for which purpose the engagement part 16 is longitudinally guided in the other parts of the drive shaft 14 in an axially extending longitudinal guide 26.

Figure 3:
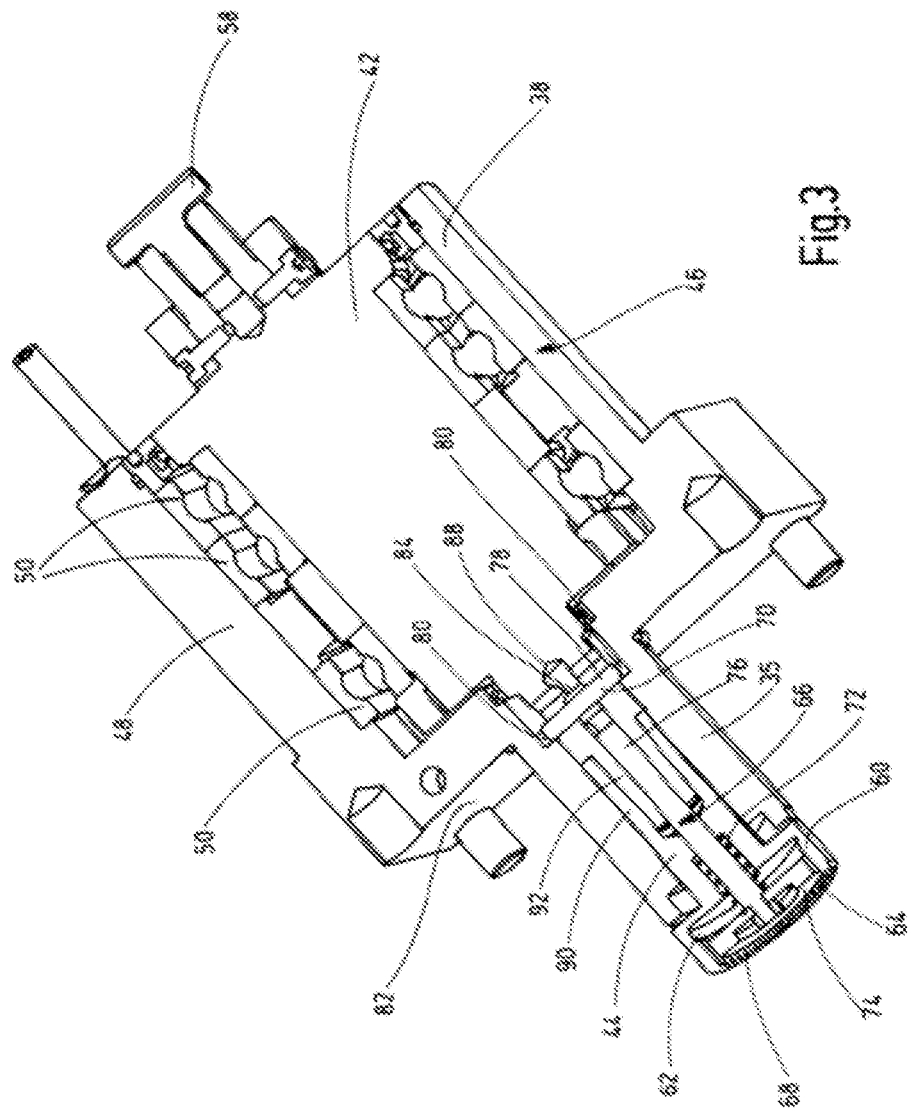
FIGS. 3 and 4 are partial perspective views in section of a tool holder without machining tool with parts of the coupling device according to the invention in the uncoupled state and in the coupled state, respectively.
Figure 4:
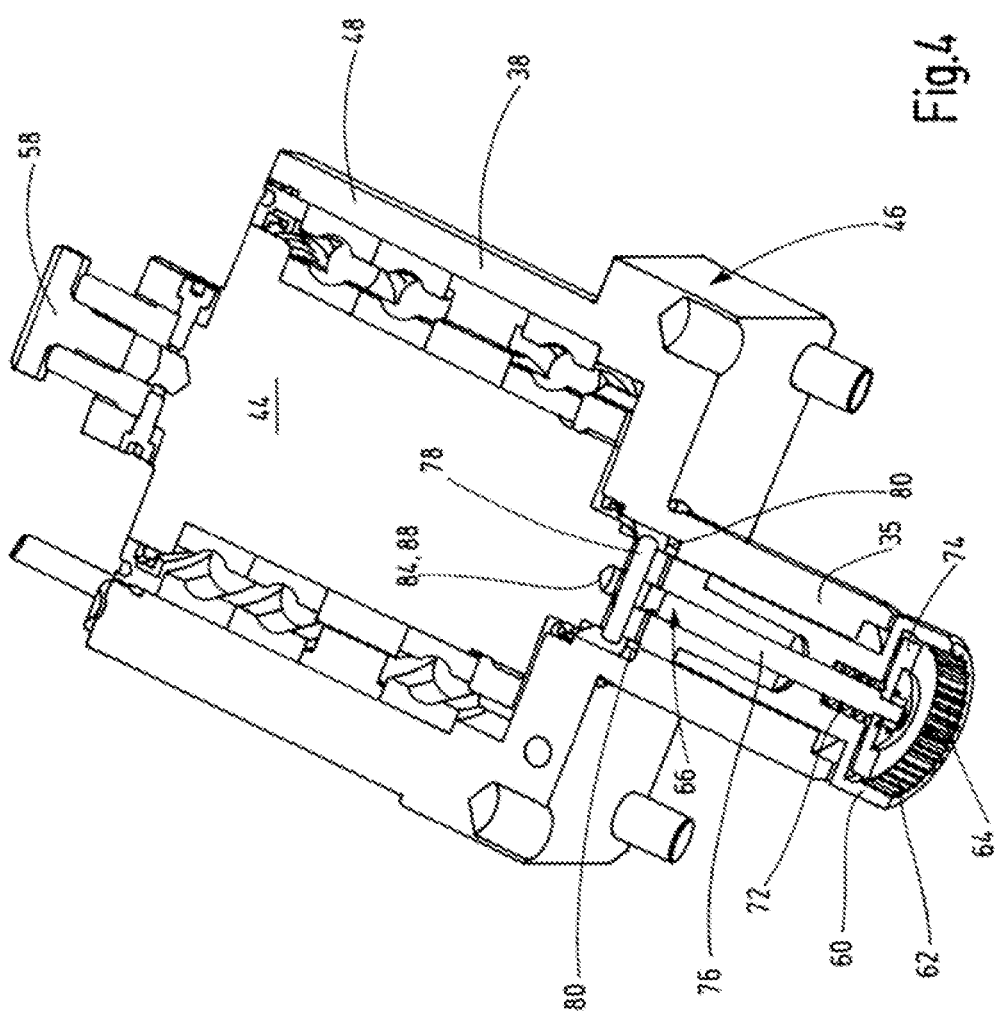

As is, furthermore, apparent from FIG. 1, the frontal engagement part 16 is provided at its free front end with internal gearing 28, which is located in the central, cylindrical recess 30 in engagement part 16. Moreover, the frontal engagement part 16 is provided at its external circumference with further gearing in form of external gearing 32. In this instance the external gearing 32 is provided on a significantly larger diameter than the diameter that is formed by the internal gearing 28. Furthermore, the tool holder disk 10 is provided with a cylindrical, central recess 34, which serves to receive corresponding cylindrical retaining pins 35 of tool holders 36, 38. The tool holder 36 (FIG. 2) is of the conventional kind. The tool holders 38 of the new design according to FIGS. 3 and 4 are provided with parts of the coupling device according to the invention. Instead of the cylindrical formation of the central recess 34 and retaining pins 35, the components that engage with each other may also at least in part have a conical shape (not shown). To simplify the illustration, the machining tool was omitted in the diagrams, which may be attached in the usual manner in the respective tool holder 36, 38, and is therefore not described in detail. Furthermore, in FIG. 1 the engagement part 16 is depicted in its forward-most end position, with the hydraulic annular chamber 20 empty or without pressure respectively and with a partially released compression spring 18 forming the hydraulic energy store. In this front engagement position, the engagement part 16 blocks the free swivelling of the tool holder disk 10 around a vertical axis, which extends transverse to the longitudinal axis of the drive shaft 14. In this front engagement state, the tool holder disk 10 is blocked in its swivelling movement via the engagement part 16 and cannot be swivelled away from it. A further motorised drive with a locking facility known per se (both not shown for reasons of clarity) serves to achieve the defined and precise fixing of the tool holder disk 10 in machining position, as is common practice.

Figure 2:
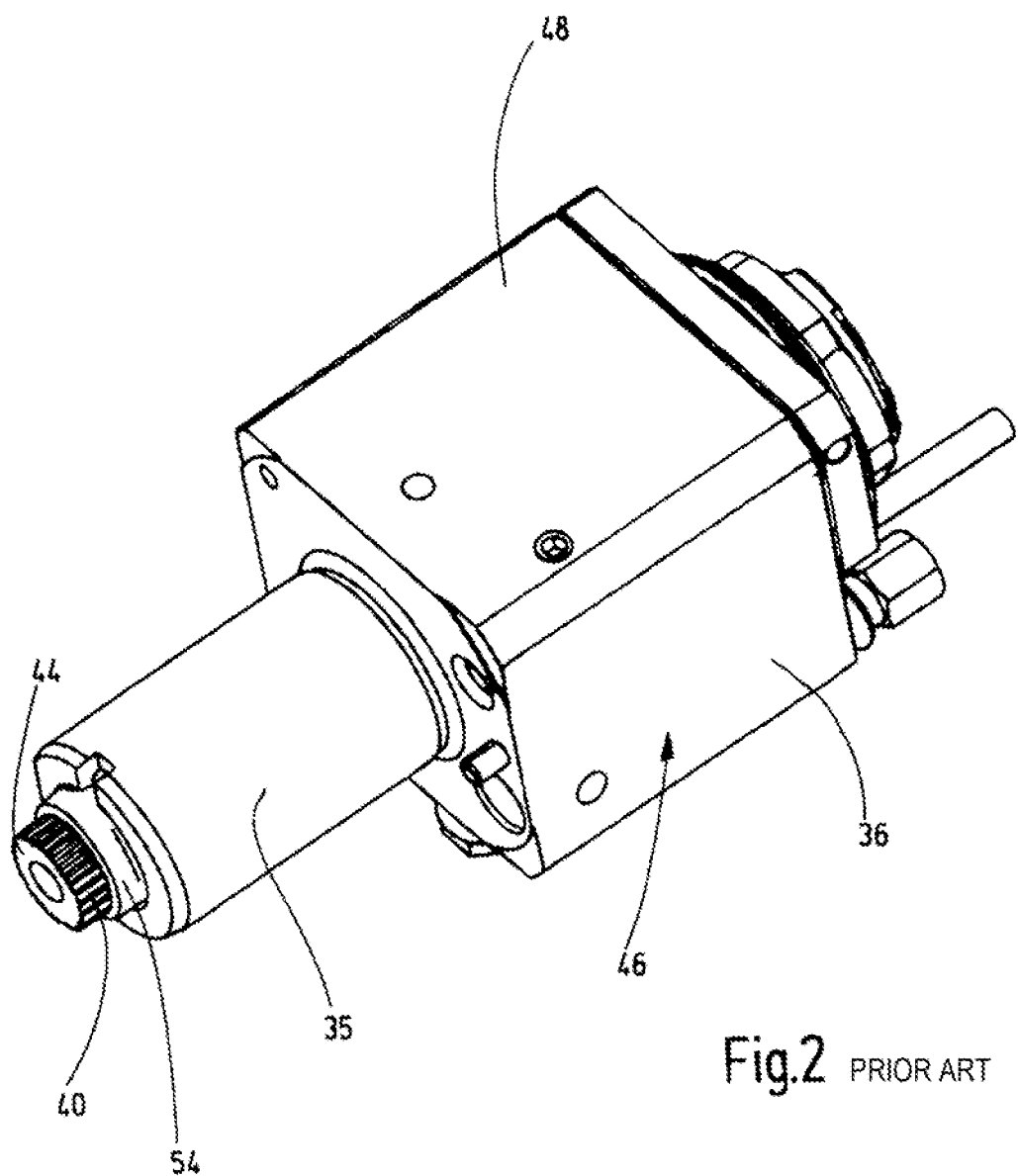
FIG. 2 is a perspective view of a tool holder without an inserted machining tool, with parts of a coupling device as used in the prior art.

The known tool holder according to FIG. 2 is provided at its cylindrical retaining pin 35 with external gearing 40 that protrudes outwards. External gearing 40 can be made to engage with the internal gearing 28 of the drive shaft 14. As is particularly apparent in FIG. 5, the tool holder 36 is provided at its inside with a type of spindle drive 42 comprising an output shaft 44 of the output unit 46 for the rotational drive of the machining tool (not shown in detail). The output unit 46 is provided with a spindle housing 48, in which the output shaft 44 is supported via bearings 50 in the usual manner. The spindle drive 42 or the output shaft 44, respectively, has a stepped shape and is provided at its right, free end face with a clamping cone 52 for clamping the machining tool, which is not shown. Disposed on the left side, when viewing FIG. 5, is a sleeve-shaped anti-rotation lock 54. Anti-rotation lock 54 is moveably guided along the outer circumference of output shaft 44 over a predeterminable path length as an alignment or indexing device and is braced with its free, right end face against a further energy store in form of a further compression spring 56. Spring 56 has the propensity to push the sleeve-shaped anti-rotation lock 54 to the left when viewing FIG. 5. In that left end stop position, the anti-rotation lock 54 locks the output shaft 44 in a predetermined radial position so that it is always ensured that the external gearing 40 engages without collision with the internal gearing 28 of the engagement part 16 of drive shaft 14. This anti-rotation lock, used here as indexing device, is described as an example in DE 42 28 946 A1, so that the design details will not be described here in detail.

Figure 6:
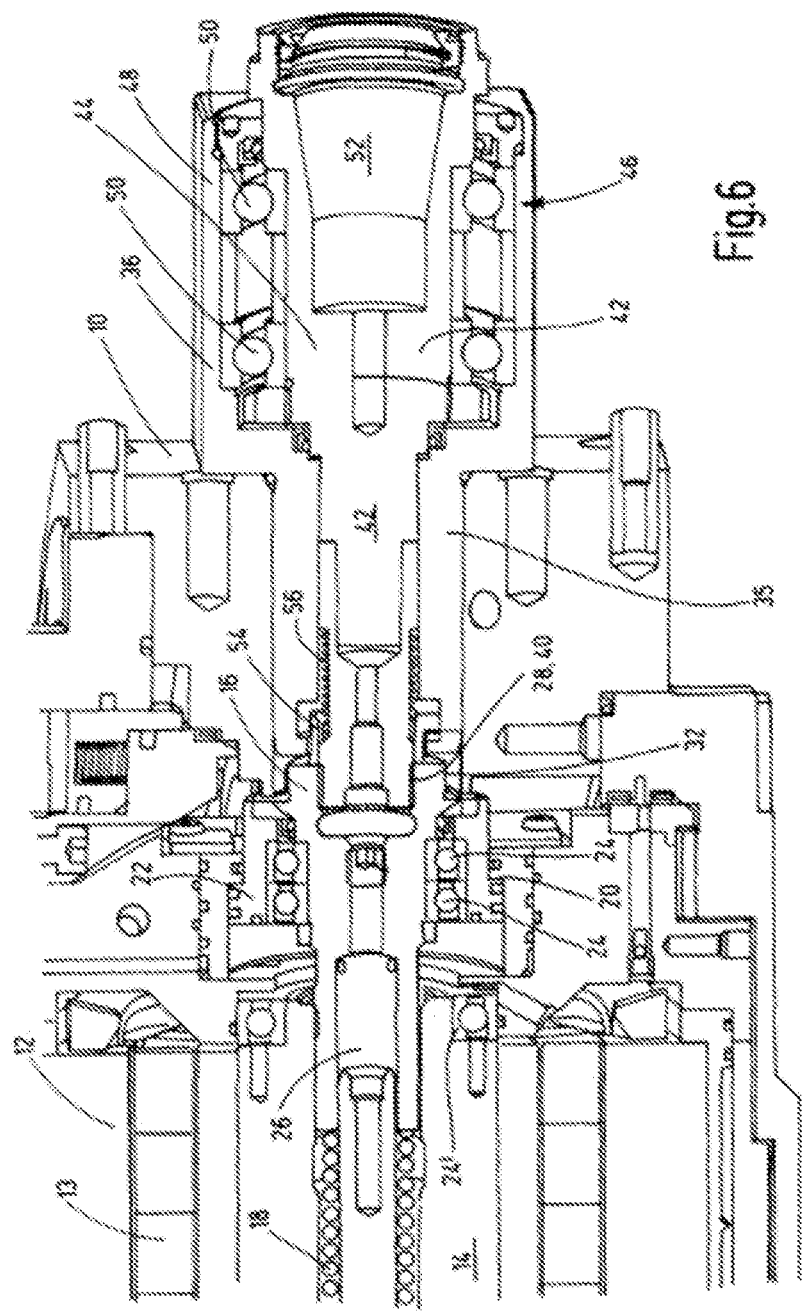

When, according to the representation in FIG. 6, the tool holder 36 is fully attached to the tool holder disk 10, the pressure in the hydraulic annular chamber 20 is released, and the engagement part 16 is pushed forward through the effect of the compression spring 18. The anti-rotation lock 54 acts here as an aligning device, such that the aligned gearings 28 and 40 engage without collision. The anti-rotation lock 54 is moved back over the free end face of the engagement part 16 against the force of the compression spring 56 to prevent any locking movement. The output shaft 44 is then able to power the spindle drive 42. In this instance, the cylindrical recess with its internal gearing 28 partially overlaps the output shaft 44 with its external gearing 40 at its free end, so that the adjacent free end faces of engagement part 16 and sleeve-shaped anti-rotation lock 54 come into surface contact with each other. When switching the electromotor on as the drive unit 13, the machining tool is driven via the then coupled connection between the drive shaft 14 and the output shaft 44.

To release the clutch, as is shown in an example in FIG. 5, the hydraulic annular chamber 20 is pressurised again, which causes the stepped piston 22 to move back, from right to left when viewing FIG. 5. The stepped piston 22 then takes the engagement part 16 with it via the two front bearings 24 against the effect of the compression spring 18. With the engagement part 16 pulled back, the tool holder disk 10 can now be swivelled again in the usual manner, and a different tool holder (not shown), which is disposed on the external circumference of tool holder disk 10, is brought into the desired machining position, as per FIG. 5, for another coupling process. As soon as the engagement part 16 moves into its retracted position, the compression spring 56 pushes the anti-rotation lock 54, which acts as aligning device, from right to left when viewing the drawing, and locks the output shaft 44 securely in its current position, so that for a renewed engagement of internal gearing 28 and external gearing 40 the teeth are aligned to each other in such a way that the gears can mesh with each other. The solution described is prior art, however, using the coupling device according to the invention as described above it is possible, as described earlier, to still couple tool holders 36 of conventional design for a machining process. If this is not desired, the internal gearing 28 of the drive shaft 14 at the drive end should be omitted. Alternatively, such coupling processes with the known tool holders 36 are simply not carried out.

The tool holder 38 according to the invention will now be described in greater detail by way of FIGS. 3 and 4. FIG. 3 shows the tool holder 38 in its uncoupled state, and the FIG. 4 shows tool holder 38 in its coupled state. As far as the tool holder 38 has components in common with the tool holder 36 according to FIG. 2, the same reference numbers are used for the same components, and the implementations carried out for it are also applicable for the new embodiment 38. Thus, the tool holder 38 also comprises a spindle housing 48, in which a stepped spindle drive 42 in form of an output shaft 44 is rotatably supported through three bearings 50 in this instance. The output unit 46 designed in this manner is provided at its upper end, when viewing the FIGS. 3 and 4, with a fixing point 58, through which a clamping unit (not shown in detail) for the machining tool may be attached and coupled to the tool holder 38. As already described, at the opposite, lower end, the spindle housing 48 merges into a cylindrical retaining pin 35, at the free, lower end of which the stepped output shaft 44 extends to the outside. The lower, free end of output shaft 44 expands into a sleeve-shaped fixing unit 60, which is provided with a centrally located, cylindrical recess 62, along which is located an internal gearing 64 of the output shaft 44. All gearing 28, 32, 40 and 64 used here is preferably in form of splines. The external circumference of the fixing unit 60 finishes essentially flush with the external circumference of the retaining pin 35.

The new tool holder solution 38 is also provided with an aligning device or aligner 66. Prior to the actual coupling process, the aligning device 66 provides a collision-free alignment between external gearing 32 of the drive shaft 14 to the internal gearing 64 of the output shaft 44. Aligning device 66 passes through parts of the output shaft 44 according to the depiction of FIGS. 3 and 4 and is provided on the one side with a control means 68 and on the other side with an aligning means or aligner 70 that can be controlled by the control or controller means 68. Aligning means 70 may be firmly attached to housing components of the spindle housing 48, which will be described in more detail below. Under the influence of a further energy store in form of a compression spring 72, the control means 68 of the aligning device 66 protrudes axially with respect to parts of the tool holder 38, particularly in form of the free end of the retaining pin 35. In the embodiment shown, the control means 68 is implemented as a control disk 74, which is guided, axially moveable inside the central recess 62, at a radial clearance to the internal gearing 64 of the output shaft 44. The control means 68 or the control disk 74, respectively, is solidly attached to a rod component 76. An engagement bolt 78 passes in transverse direction though the other free end of the rod component. The engagement bolt 78 is retained as alignment means for the output shaft 44. In accordance with the representation in FIG. 3, in the uncoupled state in pocket-shaped or groove-shaped recesses 80 on the inside of the retaining pin 35, are at the location of the transition of the retaining pin 35 to the free end face 82 of the remaining spindle housing 48.

Furthermore, the rod component 76 is provided at its free end, which is disposed adjacent to the engagement bolt 78, with a rod-shaped centring facility 84. In the coupled state according to the representation in FIG. 4, centring facility 84 is in engagement with corresponding parts of the output shaft 44 in form of a conical guide recess 88. In order to form the guide for the rod component 76, the fixing unit 60 with the internal gearing 64 is rigidly connected via a cylindrical extension 90 with a correspondingly-shaped central extension 92 of the output shaft 44. The extensions 90, 92 may be screwed together, for example. Since the engagement bolt 78, acting as aligning means 70, also passes through the central extension 92 of the output shaft 44 and then also through the output shaft 44 itself, the output shaft 44 is fixed in its respective position as soon as the engagement bolt 78 is fixed in spindle housing 48 through engagement with the transverse-extending recesses 80. The fixing unit 60 can then no longer be swivelled, but retains the position shown in FIG. 3 in the decoupled state of tool holder 38.

If, however, the control disk 74 is operated in the coupled state of the tool holder 38, which will be described below in greater detail, the control disk 74 will, as per the representation in FIG. 4, be pushed further into the cylindrical recess 62 against the compression spring 72. Via the rod component 76, the engagement bolt 78 is disengaged from the recesses 80 in spindle housing 48 with the result that via the internal gearing 64 of the output shaft 44, which is released at that stage, a rotational movement for driving a not-depicted machining tool can occur. To ensure a reliable centring of the rod component 76, its free end in form of the centring facility 84 engages with the guide recess 88 of the output shaft 44. If, from the coupled state shown in FIG. 4, decoupling is required again, the aligning device 66 as a whole assumes again its position as shown in FIG. 3, and the output shaft 44 is rotationally locked again in spindle housing 48 via the locked engagement bolts 78 that act as aligning means 70.

Figure 7:
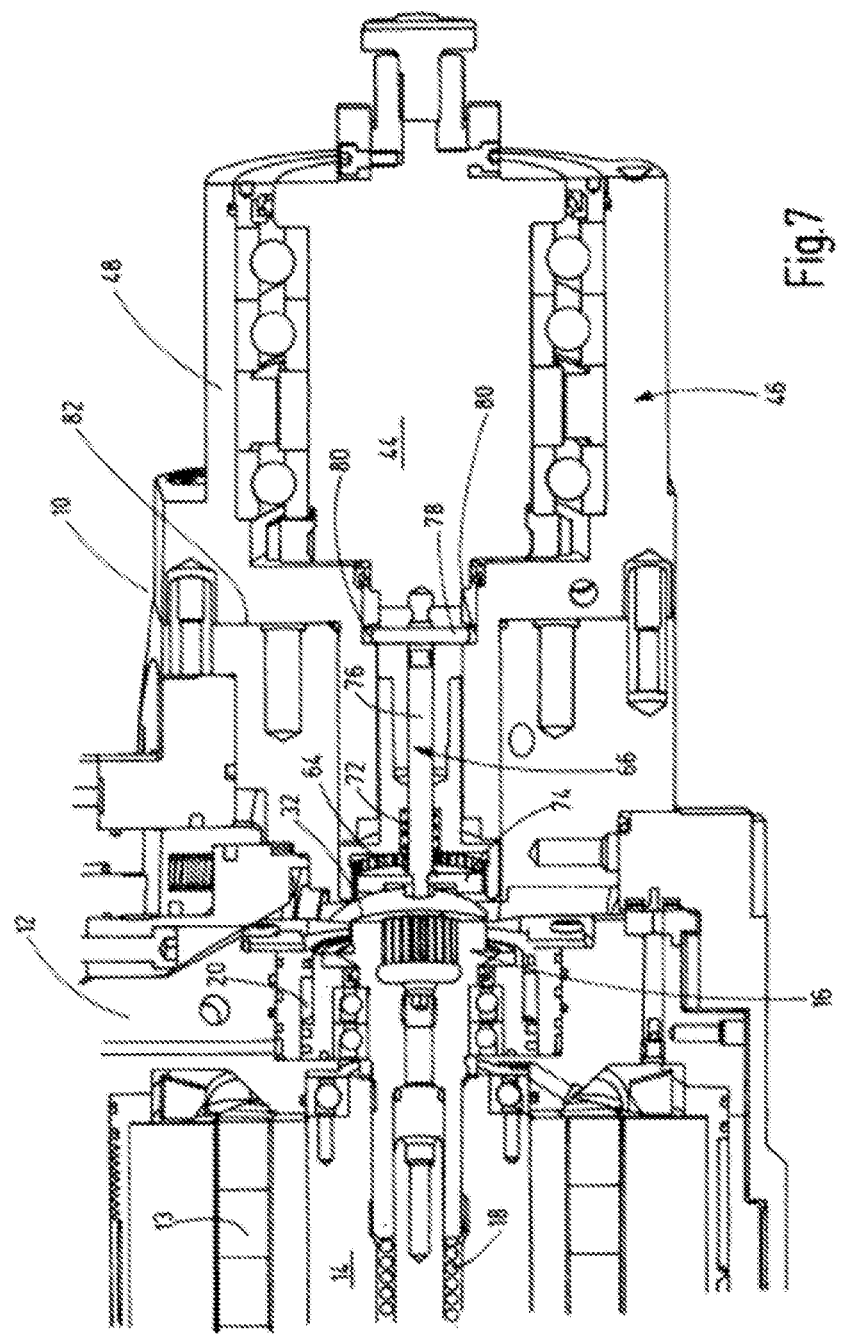

Corresponding to the already presented solutions according to FIGS. 5 and 6, the FIGS. 7 and 8 depict the new tool holder 38 in a decoupled state on tool holder disk 10 and in a coupled state, respectively. In this instance the tool holder 38 according to FIG. 3 is retained in this operating position in tool holder disk 10 according to the depiction in FIG. 7.

The tool holder 38 in the coupled state according to FIG. 4 is shown in the corresponding clamping position according to FIG. 8. To change from the uncoupled or decoupled state according to FIG. 7 into the coupled state according to FIG. 8, the pressure in the hydraulic annular chamber 20 is released. Due to the effect of the compression spring 18, the engagement part 16 is moved, as already described, from its rear position according to FIG. 7 into its front position according to FIG. 8. As a result, the external gearing 32 of the drive shaft 14 enters into a clutch engagement with the internal gearing 64 of the output shaft 44. The front free end face of the engagement part 16 engages with the front end face of the control disk 74 and pushes it back from left to right, as viewed in FIG. 7 until the transverse-extending engagement bolt 78 of the aligning device 66 according to the invention disengages from the pocket-shaped recesses 80 in spindle housing 48. This way the output shaft 44 is released and can be driven through the coupled drive shaft 14 via the electromotor 13.

This fully coupled state is shown by way of example in FIG. 8. The decoupling process takes place in reverse order, as already described for the solution according to FIGS. 5 and 6. Through applying pressure to the hydraulic annular chamber 20, the stepped piston 22 moves back against the spring action of the compression spring 18, with the result that the engaged external gearing 32 of drive shaft 14 and the internal gearing 64 of the output shaft 44 are disengaged. The aligning means 70 of the aligning device 66 in form of the engagement bolt 78 is then retained again in the corresponding recesses 80 in spindle housing 48. This way the output shaft 44 is locked exactly into a position that ensures a collision-free and accurate engagement of the gearing where the splines of one gear fit exactly into the gaps of the other gear.

As soon as the aligning devices 54, 66 are unlocked in the decoupled state for the tool holders 36 and 38 respectively, they are rotationally driven via the respective output shaft 44 until the end of the machining process.

While applying the solution according to the prior art shown in FIG. 2, as shown in FIGS. 5 and 6, torque values between drive shaft 14 and output shaft 44 of approximately 55 Nm may be transferred at a 10% duty cycle. The new gear solution with greater engagement diameters provides for a torque transfer of 85 Nm and more. This increased torque transfer permits the application of more powerful direct drives in the tool turret since the shaft-hub connections between the corresponding gears on a larger diameter permit a greater transfer torque. Ensured is in particular that a mechanical failure can no longer occur during torque transfer by the engaged gears.

While one embodiment has been chosen to illustrate the invention, it will be understood by those skilled in the art that various changes and modifications can be made therein without departing from the scope of the invention as defined in the claims.

The invention claimed is:

1. A tool turret, comprising:
a drive unit having a drive shaft with an external gearing;
a rotatable tool holder disk;
a tool holder receivable by and rotatable with the tool holder disk and having an output unit and capable of retaining a machining tool, the output unit having an output shaft with an internal gearing, the internal gearing engaging the external gearing when the external gearing is in a first clutch position, and the external gearing and the internal gearing forming a coupling that detachably engages and forms a drive connection between the drive unit and the output unit such that the drive unit rotationally drives the output shaft; and
an aligner ensuring a collision-free alignment between the external gearing and the internal gearing prior to engagement of the external gearing and the internal gearing, the aligner including on one side thereof a control that interacts with the drive shaft, and the aligner including, on a side thereof that is opposite the one side, an engager that is moveable so as to engage the tool holder, wherein movement of the control moves the engager.

2. A tool turret according to claim 1 wherein
the internal gearing is at an end of the output shaft, and receives the external gearing of the drive shaft of the drive unit in a coupled state of the coupling, the tool holder encompassing the output shaft and the aligner at least partially.

3. A tool turret according to claim 1 wherein
the drive shaft of the drive unit is rotatably supported in a shaft holder, the drive shaft and the shaft holder being moveable between: (i) a coupling position in which the external gearing is coupled to the internal gearing, and (ii) a decoupling position in which the external gearing is decoupled from the internal gearing.

4. A tool turret according to claim 3 wherein
the control of the aligner is biased by an energy store to a position at which the control protrudes relative to parts of the tool holder and the engager is engaged with the tool holder; and
wherein when the drive shaft and the shaft holder are in the coupling position, the control contacts the drive shaft and the engager is disengaged from the tool holder.

5. A tool turret according to claim 3 wherein
the aligner further comprises a rod component extending through parts of the output shaft, and wherein the control is a control disk, and wherein the engager is an engagement bolt aligning the external gearing and the internal gearing, the engagement bolt being attached to the rod component and being fixable in pocket-shaped or groove-shaped recesses in wall sections of the tool holder.

6. A tool turret according to claim 5 wherein
the rod component has a centering facility at a free end of the rod component adjacent to the engagement bolt, the centering facility being engaged with parts of the output shaft of the tool holder when the drive shaft and the shaft holder are in the coupling position.

7. A tool turret according to claim 3 wherein
the shaft holder is movable backward into the decoupling position by introduction of hydraulic pressure and is moved forward into the coupling position by an energy store when the hydraulic pressure is released.

8. A tool turret according to claim 7 wherein
the energy store is a compression spring.

9. A tool turret according to claim 1 wherein
the control is movable along an axis, and wherein the control is surrounded by the internal gearing of the output shaft in every one of the possible axial displacement positions of the control.

10. A tool turret according to claim 1 wherein
the tool holder is fixed to a circumference of the tool holder disk.

11. A tool turret according to claim 1 wherein
the internal gearing is at a free end of the output shaft and
a portion of the aligner passes through the internal gearing.

* * * * *